US011585957B2

(12) United States Patent
Jobling et al.

(10) Patent No.: US 11,585,957 B2
(45) Date of Patent: Feb. 21, 2023

(54) SYSTEM AND METHOD FOR OBJECT SCREENING AND HANDLING

(71) Applicant: International Consolidated Airlines Group, S.A., Madrid (ES)

(72) Inventors: Daniel Jobling, Harmondsworth (GB); Glenn Morgan, Harmondsworth (GB); Harvey Tate, Harmondsworth (GB)

(73) Assignee: International Consolidated Airlines Group, S.A., Madrid (ES)

( * ) Notice: Subject to any disclaimer, the term of this patent is extended or adjusted under 35 U.S.C. 154(b) by 370 days.

(21) Appl. No.: 16/640,979

(22) PCT Filed: Aug. 22, 2018

(86) PCT No.: PCT/GB2018/052386
§ 371 (c)(1),
(2) Date: Feb. 21, 2020

(87) PCT Pub. No.: WO2019/038543
PCT Pub. Date: Feb. 28, 2019

(65) Prior Publication Data
US 2020/0191990 A1 Jun. 18, 2020

(30) Foreign Application Priority Data
Aug. 22, 2017 (GB) ..................................... 1713462

(51) Int. Cl.
*G01V 5/08* (2006.01)
*B60P 3/00* (2006.01)
(Continued)

(52) U.S. Cl.
CPC .............. *G01V 5/0008* (2013.01); *B60P 3/00* (2013.01); *G06Q 10/08* (2013.01)

(58) Field of Classification Search
CPC ............. G06Q 50/28; G06Q 10/06315; G06Q 30/018; G06Q 2240/00; G06Q 10/08;
(Continued)

(56) References Cited

U.S. PATENT DOCUMENTS 5,319,547 A * 6/1994 Krug .................... G01N 23/083
705/13
5,974,111 A * 10/1999 Krug .................... G01N 23/083
378/53
(Continued)

FOREIGN PATENT DOCUMENTS

DE 102005043490 A1 * 3/2007 .............. B60P 1/003
EP 3112851 A1 1/2017
(Continued)

*Primary Examiner* — Gregory W Adams
(74) *Attorney, Agent, or Firm* — Sterne, Kessler, Goldstein & Fox P.L.L.C.

(57) ABSTRACT

Systems and methods for automated security inspection and routing of in-transit objects are described. In one embodiment, a plurality of security screening devices are provided, each operable to output screening data of an in-transit object, including a first screening device located in a sealed environment of a vehicle for transporting the object towards a conveying system, including one or more measuring devices operable to measure screening parameters of the object when located in the sealed environment, and a second screening device in combination with conveying and routing components of the conveying system used to transport said objects from an ingress point through a conveyor junction to reach the second screening device. A control unit is assigned to the conveyor junction, wherein the control unit is configured to receive security data assigned on the basis of the screening data from the first screening device to the object upstream of the conveyor junction, and in response, to determine and set a routing direction on the basis of the assigned security data, whereby the object is directed downstream to a screening route for further screening by the second screening device, or to a loading route for objects cleared for loading. Other embodiments are also described and claimed.

14 Claims, 8 Drawing Sheets

(51) Int. Cl.
*G01V 5/00* (2006.01)
*G06Q 10/08* (2023.01)

(58) Field of Classification Search
CPC .. G06F 16/5866; G06V 20/52; G06V 40/168; G06K 7/10297; G06K 7/10386; G06K 19/0723; G06K 2007/10504; H04N 5/38; H04N 5/76; H04N 7/18; G01V 5/0016; G01V 5/0008; B60P 3/00
See application file for complete search history.

(56) References Cited

U.S. PATENT DOCUMENTS

| | | | |
|---|---|---|---|
| 7,312,702 B1 | 12/2007 | Willms et al. | |
| 8,669,861 B1 | 3/2014 | Meyers | |
| 8,827,200 B2 * | 9/2014 | Radu | B60F 5/02 244/23 B |
| 2004/0041706 A1 | 3/2004 | Stratmoen et al. | |
| 2004/0066887 A1 * | 4/2004 | Garfinkle | G01N 23/04 378/57 |
| 2004/0130442 A1 | 7/2004 | Breed et al. | |
| 2004/0232054 A1 | 11/2004 | Brown et al. | |
| 2005/0258231 A1 | 11/2005 | Wiater | |
| 2008/0017426 A1 * | 1/2008 | Walters | B60F 3/003 296/193.04 |
| 2013/0156156 A1 * | 6/2013 | Roe | G01V 5/0016 378/57 |
| 2015/0325010 A1 * | 11/2015 | Bedford | G01V 5/0016 378/57 |
| 2015/0378048 A1 * | 12/2015 | Schubert | G01N 23/04 378/57 |
| 2016/0052718 A1 * | 2/2016 | Li | G01N 23/02 198/572 |

FOREIGN PATENT DOCUMENTS

| | | |
|---|---|---|
| GB | 2518309 B | 8/2015 |
| WO | 2011106745 A1 | 9/2011 |
| WO | 2016070650 A1 | 5/2016 |

* cited by examiner

SYSTEM AND METHOD FOR OBJECT SCREENING AND HANDLING

FIELD OF THE INVENTION

This invention relates generally to systems and methods for object screening and handling, and more particularly to a travelling screening environment for security screening of objects en route to a transportation craft.

BACKGROUND

Security is a vital aspect in commercial transportation infrastructures and conventional departure control systems typically require screening of objects, such as for presence of potentially dangerous and/or illegal contents or substances, prior to loading and/or embarking of the screened 'clean' objects onto the transportation craft, e.g. aircraft, ship, train, bus, etc. Various types of conventional baggage and passenger screening machines are known, such as Computed Tomography (CT) systems, explosives detection systems (EDS), X-ray systems, explosives trace detections (ETD), full-body scanners, metal detectors, etc. However, such object screening and handling systems are conventionally implemented at respective security check-points within a departure terminal. Providing and maintaining high levels of processing efficiencies in such conventional screening processes is difficult, as every unscreened 'dirty' object, such as items of baggage and passengers, must pass through the respective security check-points. The resulting bottlenecks and queues invariably lead to unsatisfactory overall passenger experience.

What is desired is an alternative technical infrastructure for object screening and handling that alleviates inconveniences and inefficiencies of conventional systems.

SUMMARY OF THE INVENTION

Aspects of the present invention are set out in the accompanying claims.

According to one aspect, the present invention provides an automated security inspection and routing system for in-transit objects, comprising a plurality of security screening devices each operable to output screening data of an in-transit object, including a first screening device located in a sealed environment of a vehicle for transporting the object to a commercial transportation craft, and a second screening device in combination with conveying and routing components used to transport said objects from an ingress point through a conveyor junction to reach the second screening device; and a control unit assigned to the conveyor junction, wherein the control unit is configured to receive security status data assigned on the basis of the screening data from the first screen device to the object upstream of the conveyor junction, and in response, to determine and set a routing direction on the basis of the security data, whereby the object is directed downstream to a screening route for further screening by at least one secondary security screening device, or to a loading route for objects cleared for loading.

In another aspect, the present invention provides an automated object routing system, comprising a computer-implemented controller configured to: receive screening data from a first security screening device located in a sealed environment of a vehicle transporting an object destined for a commercial transportation craft, the first security screening device including one or more measuring devices operable to measure screening parameters of the object when located in the sealed environment; generate routing data defining a conveying route for the object in dependence upon the received screening data of the object; and cause a transfer of said object along the defined conveying route, from an ingress point of a conveying system, through at least one conveyor switch point, to one of a routing target associated with an assigned transportation craft or a second security screening device.

In yet another aspect, the present invention provides a vehicle in the above systems, comprising the first screening device located in a sealed environment of the vehicle, and means for transmitting screening data of an in-transit object to a remote data processing server of the system.

In a further aspect, the present invention provides a retrofitting kit for retrofitting a vehicle with a screening device, which vehicle operable to transport an object in a sealed environment, comprising one or more measuring devices to be located in the sealed environment of the vehicle and operable to measure screening parameters of the object in the sealed environment.

In another aspect, the present invention provides a system comprising a control module for controlling a conveyor device in a sealed environment of a vehicle, which conveyor device being configured to displace a baggage item from a resting position into a moving position in a fully automatic manner by means of a motor, the control module comprising a control device for: measuring, by one or more measuring devices, screening parameters of the baggage item; transmitting, by a communications interface, data signals corresponding to measured screening parameters; comparing, by a comparator, the measured screening parameters with pre-determinable set values of corresponding security parameters; and checking, by a checking device, that the security parameters are observed before allowing a displacing movement of the conveyor device.

In another aspect, the present invention provides an automated security inspection and routing system for in-transit objects, comprising a computer-implemented controller configured to: receive screening data from a screening device located in a sealed environment of a vehicle transporting an object destined for a routing target, which screening device operable to measure, by one or more measuring devices, screening parameters of the object; transmit, by a communications interface, data signals corresponding to measured screening parameters; compare, by a comparator, the measured screening parameters with pre-determinable set values of corresponding security parameters; and check, by a checking device, that the security parameters are observed before generating a security data token for transmission to and verification by a computing system of the routing target.

In other aspects, there are provided apparatus and systems configured to perform the methods as described above. In a further aspect, there is provided a computer program comprising machine readable instructions arranged to cause a programmable device to carry out the any one of the methods as described above.

BRIEF DESCRIPTION OF THE DRAWINGS

There now follows, by way of example only, a detailed description of embodiments of the present invention, with references to the figures identified below.

FIG. 2, which comprises FIGS. 2A to 2C, schematically illustrates examples of a vehicle that is fitted or retrofitted with measuring devices of an in-transit screening unit according to an exemplary embodiment of the invention.

FIG. 4, which comprises FIGS. 4A and 4B, schematically illustrates examples of a vehicle adapted or retrofitted with components of an automated loading component according to other exemplary embodiments of the invention.

FIG. 5, which comprises

DESCRIPTION OF EMBODIMENTS

Figure 1:
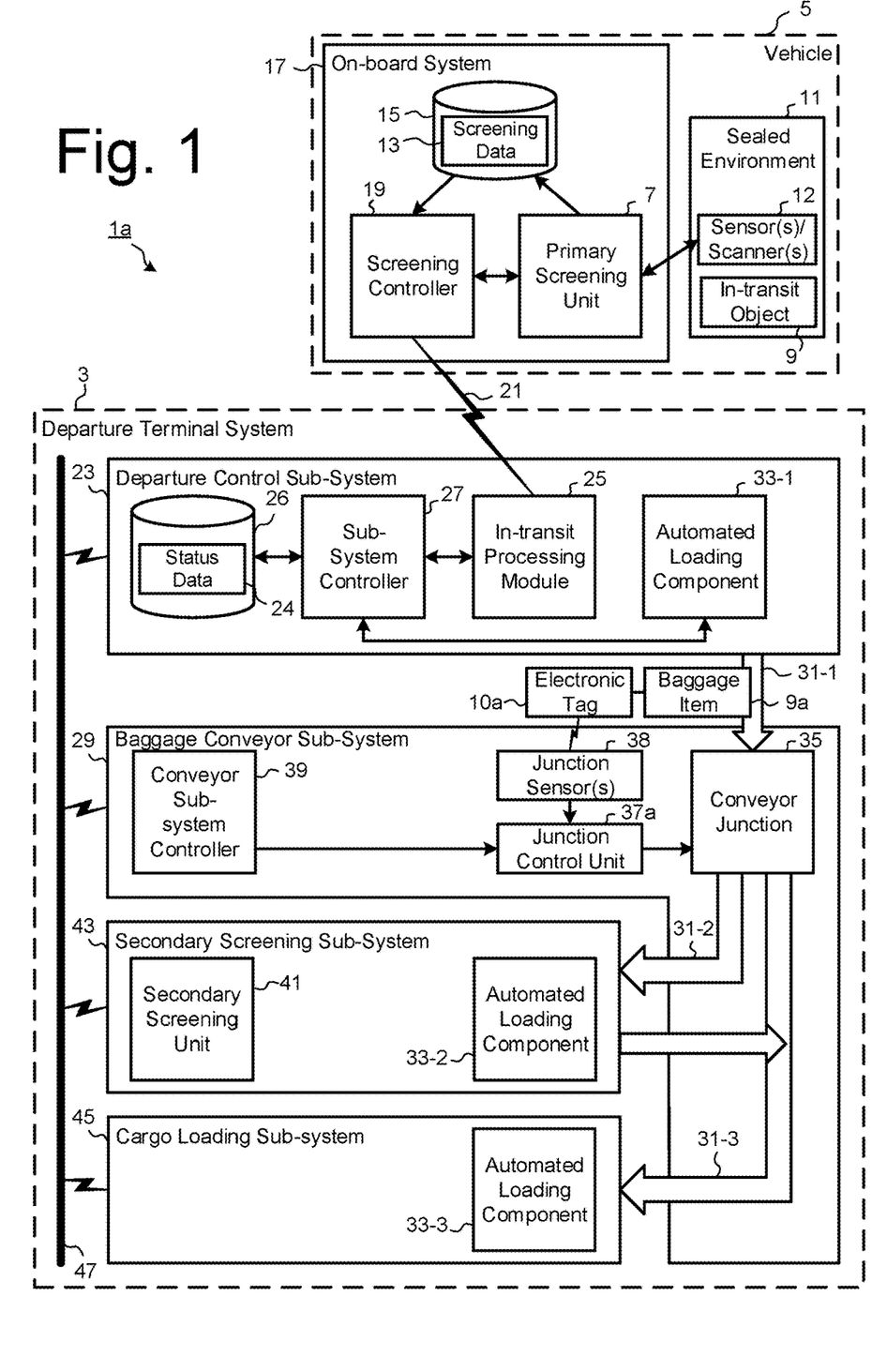
FIG. 1 is a schematic block diagram illustrating elements of an automated security inspection and routing system for in-transit objects according to an exemplary embodiment of the invention.

FIG. 1 is schematic block diagram illustrating elements of an object screening and routing system 1a according to an exemplary embodiment that relates to commercial travel. Aspects of the present embodiments are applicable to the automated screening of objects destined for any form of commercial transportation, such as airplane, ship, train and bus travel. More particularly, aspects of the present embodiments are described in the context of security screening of objects, such as a passenger and/or a baggage/luggage item, located in a vehicle that is transporting such in-transit objects towards a departure terminal, a conveying system of the departure terminal, or the commercial transportation craft departing from a departure terminal. It is appreciated that at least some of the elements are optional, at least for certain applications.

As shown in FIG. 1, in this embodiment, an automated data processing and control system 3 of a departure terminal receives in-transit notifications from vehicles 5 transporting passengers and/or baggage items to the departure terminal, or to transportation crafts departing from that terminal. Each vehicle 5 is configured with a primary screening unit 7 for obtaining information about the in-transit object(s) 9 from one or more measuring devices 12, such as sensors or scanners, provided in a hermetically sealed environment 11 of the vehicle 5. The sealed environment 11 may be the passenger cabin, the boot/trunk, or a separate sealed compartment of the cabin or boot/trunk. Alternatively, the sealed environment 11 may be embodied as a container adapted to be readily lifted and transported with the in-transit object 9a contained therein. The term "sealed" used throughout the embodiments is to be understood as meaning hermetically sealed when the vehicle 5 is in use, whereby the object 9 transported therein is insulated or protected from outside influences and substances, thereby ensuring that the measured screening parameters by the primary screen unit 7 are representative of the in-transit object 9 itself.

Figure 2A:
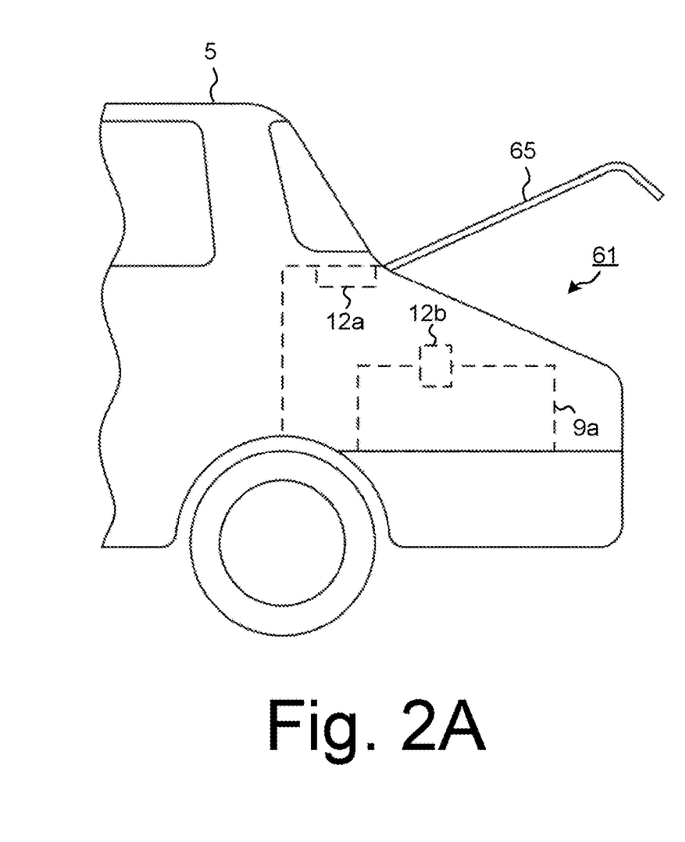
Figure 2B:
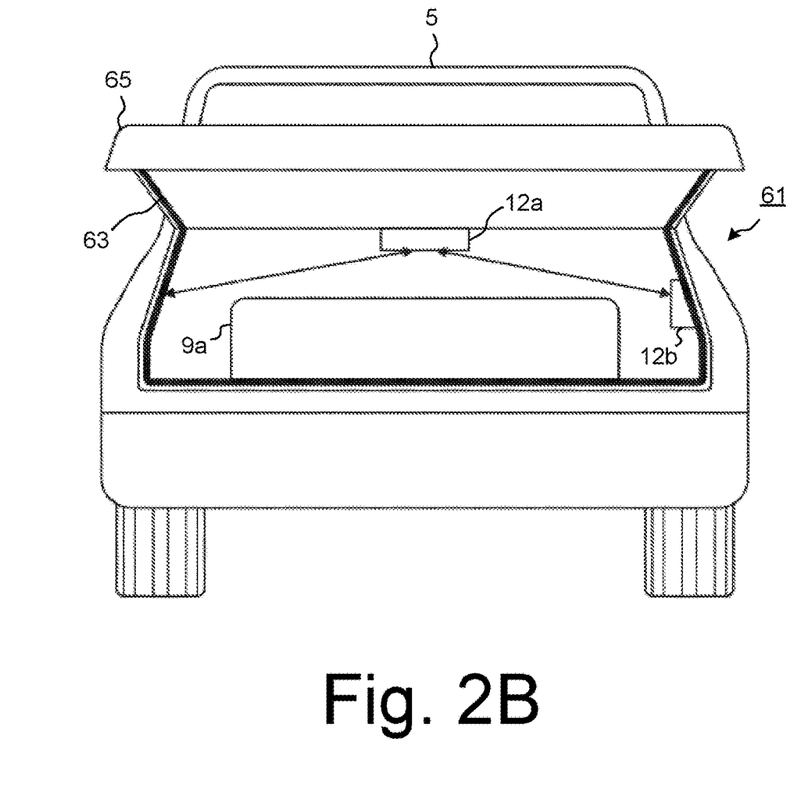

FIGS. 2A and 2B schematically illustrate one example of a conventional motor vehicle that is fitted or retrofitted with a plurality of measuring devices 12 located in the boot or trunk 61 (which may also be referred to as a luggage compartment or hold) of a motor vehicle 5. FIG. 2A shows a schematic side view and FIG. 2B shows a corresponding rear view. As shown, the measuring devices 12 are arranged to be able to measure screening parameters of an object 9a that is located in the sealed environment, and operable to communicate measured data to the in-transit screening unit 7 of the vehicle's on-board system 17. One or more sealing elements 63 are provided in order to hermetically seal the internal space the boot or trunk 61 to form the sealed environment 11, when the lid 65 of the boot or trunk 61 is closed. In this embodiment, the in-transit object(s) 9 are baggage items contained in the hermetically sealed environment 11, the baggage items associated with a passenger seated within the vehicle cabin and having an assigned travel ticket and itinerary associated with a respective commercial transportation craft.

Each measuring device 12 may measure one or more screening parameters, or measurable characteristics/attributes, of the in-transit object 9, such as size, weight, detected dangerous/illegal substances, temperature, moisture, biometric profile such as face, voice, finger print, etc. For example, the or each measuring device 12 may be one or more of: a pressure sensor, a camera, a microphone, a body scanner, CT/CAT/MRI/NMRI scanner, EDS, ETD, X-ray system and/or metal detector, particulate/substance detector, infrared scanner, sensors on a door of the vehicle, tamper seals, etc. Other sensors/scanners may be provided to detect measurable characteristics or attributes of ambient environment itself, such as air pressure, temperature, light level, sound, etc. which can be used to determine and/or verify that the sealed environment is not or has not been tampered with. One or more of the measuring devices 12 implemented in the primary screening unit 7 may be of a type suitable to perform scanning of in-transit objects to the same specifications and requirements as known stationary scanners within airport terminals.

As shown in the example of FIGS. 2A and 2B, a first measuring device 12a may be located centrally on a ceiling surface of the boot or trunk 61 of the vehicle 5, substantially equidistant from the side walls of the boot or trunk 61, to measure screening parameters of the object from a first screening direction, in this case from the top-down over a maximal coverage area. A second measuring device 12b may be located on a side wall of the boot or trunk 61 to measure screening parameters of the object from a second screening direction, in this case transversely across the width of the sealed environment.

As an example configuration, the first measuring device 12a may include X-ray emitter and detector components to image the inside of the in-transit object 9a in a first plane. Such an X-ray device may be configured to follow a scanning route around the sealed environment to create a more detailed image of the object 9a. The shape of the environment may be further adapted to reduce or increase bounce back/reflection of the emitted rays. The first measuring device 12a may instead or additionally include an infrared imaging sensor, which may be configured to follow the same scan path as the X-ray device. The second measuring device 12b may also include X-ray emitter and detector components to image the inside of the in-transit object 9a in a second plane. The second measuring device 12b may instead or additionally include a particulate sensor for measuring the presence of dangerous and/or illegal substances on or in the in-transit object 9a. Such a measuring device 12b may be further adapted to establish an airflow, for example by means of a suction pump, and/or a fan (not shown) that may be located on the opposite side wall of the boot/trunk 61. The shape of boot/trunk space may also be adapted to control and direct the flow of air across the in-transit object 9a and towards the measuring device 12b.

As another example configuration, a measuring device 12 may be configured to include a vacuum device operable to create a partial vacuum, for example to the same pressure as an aircraft when in-flight, after the lid 65 is closed to seal the environment, and to direct the vacuum exhaust over a sensor of the measuring device 12. In this way, the measuring device 12 utilises the vacuum exhaust to achieve full scanning coverage of the in-transit object 9a.

Figure 2C:
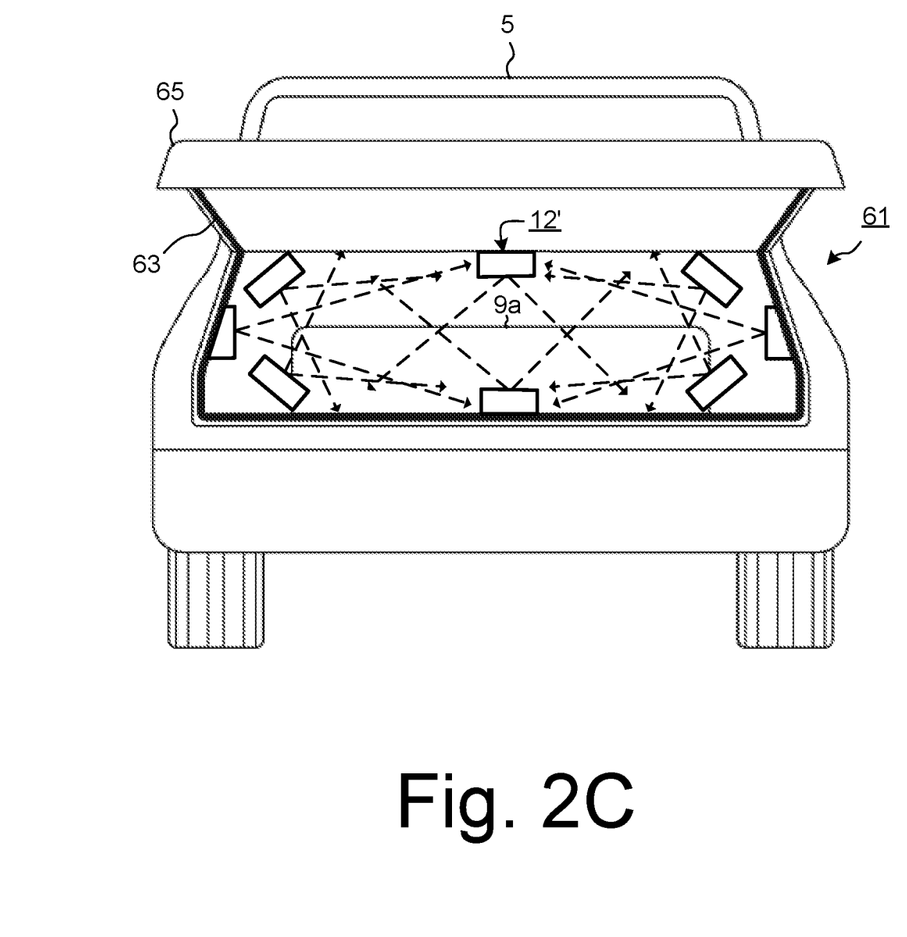

FIG. 2C schematically illustrates another example of an alternative arrangement of measuring devices 12' that are fitted or retrofitted within the boot or trunk 61 of a motor vehicle 5. As shown, a plurality of measuring devices 12', eight in the illustrated example, are located at respective positions of the internal surfaces of the boot or trunk 61 of the vehicle 5, each having a respective effective scanning direction and range. Each measuring device 12 is thereby arranged to measure screening parameters of the object 9a from a respective screening direction, the combination of measuring devices 12' providing substantially full coverage of the internal area of the boot or trunk 61.

Referring back to FIG. 1, data received from the measuring device(s) 12 may be processed by the primary screening unit 7 and stored as in-transit screening data 13 in a memory 15 of the vehicle's on-board computing system 17. The screening data 13 may include information correlating the passenger, baggage item(s), an assigned identifier of the transportation craft, travel itinerary attributes, and/or the vehicle. The screening data 13 is communicated by a screening controller 19 of the vehicle on-board system 17 to the departure terminal system 3, via a data communication path 21. The data communication path 21 may be established over any suitable cellular communication network or combination of networks, such as Global System for Mobile Communications (GSM), General Packet Radio Service (GPRS), Code Division Multiple Access (CDMA), CDMA2000, Enhanced Data Rates for GSM Evolution (EDGE), Evolved High-Speed Packet Access (HSPTA+), Long Term Evolution (LTE), etc.

A departure control sub-system 23 of the departure terminal system 3 is configured with an in-transit data processing module 25 that receives the in-transit screening data 13 from the vehicle on-board system 17. In this exemplary embodiment, the in-transit data processing module 25 includes a comparator to compare the measured screening parameters with pre-determinable set values of corresponding security parameters, and a checking device to perform the in-transit security screening check, for example by determining that the security parameters are observed. Upon successful verification that the security parameters are observed, the in-transit data processing module 25 may generate a security data token for transmission to and verification by, for example, the departure control sub-system 23 or a computing system of a third-party routing target. The token may comprises ID data identifying a verified status of a passenger or delegated authority that is associated with the 'clean' baggage item 9a. As an alternative, the data processing for the in-transit security screening check and security data token generation may be performed by the screening controller 19 of the vehicle on-board system 17.

The departure control sub-system 23 may include distributed computing terminals at a respective plurality of check-in/drop-off counters in the departure terminal. The received in-transit screening data 13 (or a security data token) is passed to a sub-system controller 27 of the departure control sub-system 23, which monitors and updates the departure (e.g. check-in) status of the passengers and identified baggage items, stored as departure status data 24 for example in one or more databases 26. The database 26 may be a relational database; however, any other type of data organizational structure may be used. The departure status data 24 may include a security status attribute assigned to each in-transit object 9, which may be generated by the departure control sub-system controller 27 based on the received in-transit screening data 13, and for example predefined security risk or assurance profile data. One example of a system for generating and dynamically monitoring a risk/assurance profile is described in the applicant's earlier application WO2017/032854. The departure terminal system 3 also includes a baggage conveyor sub-system 29 having conveying and routing components used to transport a baggage item 9a from an ingress point, such as a baggage drop-off point or a check-in counter, on one of a plurality of conveyor routes 31 to a routing destination based on the basis of the associated in-transit screening data 13. As is known in the art, the conveying components typically include motorized conveyor segments, such as rollers, belts or bands, and junctions 35, such as motorized gates or switches, for moving baggage items along a conveyor route or path. Object detectors 38 may be located upstream of each junction 35 and between each pair of consecutive motorized conveyor segments, transmitting position and movement event data for each detected baggage item, for example to the conveyor sub-system controller 39 and/or the departure control sub-system 23. The ingress point, such as the check-in/drop-off counter, may be manned or automated, for example with an automated loading component 33-1 such as a robotic lifting arm, to transfer the baggage item 9a to a first conveyor route 31-1. Alternatively, the vehicle itself may include one or more automated arms for loading the baggage items onto a drop-off platform, trolley, container, etc.

In this embodiment, each baggage item is associated with a unique ID assigned by the departure control sub-system 23, for example in accordance with established IATA standards for baggage tags. The unique ID may be stored as data in a corresponding electronic bag tag 10a attached to the baggage item 9a. The electronic bag tag 10a may be of a type as described in WO2015/036738. Alternatively, the unique ID may be encoded into a machine readable form that is printed on a conventional tag attached to the baggage item 9a.

The departure terminal system 3 processes the received in-transit screening data 13 (or the security data token) to control object routing sub-systems of the airport terminal system 3, such as the baggage conveyor sub-system 29 that dynamically determines and sets a routing direction for a baggage item 9a upstream of a conveyor junction 35 on the basis of the associated in-transit screening data 13. In this exemplary embodiment, a junction control unit 37a is assigned to each conveyor junction 35, under super-control of a baggage conveyor sub-system controller 39. The one or more object sensors 38 at each conveyor junction 35 detect a baggage item 9a upstream of the associated conveyor junction 35, and determine or identify the unique ID of the detected baggage item 9a. For example, the junction sensors 38 may include a tag reader or communications interface for enabling one or more communications links to the electronic tag 10a to request and retrieve the stored unique ID. The communications links may comprise one or more of a short-range wireless link, such as Bluetooth®, Bluetooth® LE or Zigbee®, and a wireless network data connection, for example using the GPRS, EDGE, 3G, 4G or 5G standards. Alternatively or additionally, the junction sensors 38 may include a camera or scanner for capturing the encoded unique ID printed on a conventional tag.

The junction control unit 37a processes security attribute data of the subject baggage item 9a, received from the data processing module 27 of the departure control sub-system 23, and controls the associated conveyor junction 35 accordingly, for example to direct the subject baggage item 9a downstream to a screening route 31-2 for further screening by at least one secondary screening unit 41 of a secondary security screening sub-system 43, or to a loading route 31-3 for objects cleared for loading onto a specified aircraft, for example by an automated loading component 33-3 of a cargo loading sub-system 45. The secondary screening sub-system 43 may also include an automated loading component 33-2 to transfer baggage items 9a from the end of the screening route 31-2 to a screening area (not shown), and subsequent to screening by the secondary screening unit 41, to transfer the baggage items 9a back to the loading route 31-3.

The various sub-systems of the departure terminal system 3 may be in electronic communication therebetween via a data network 47. The data network 47 may be any suitable data communication network or combination of networks, such as a wireless network, a local- or wide-area network including a corporate intranet or the Internet, using for example the TCP/IP protocol, or one or more of the cellular communication networks mentioned above.

Figure 4A:
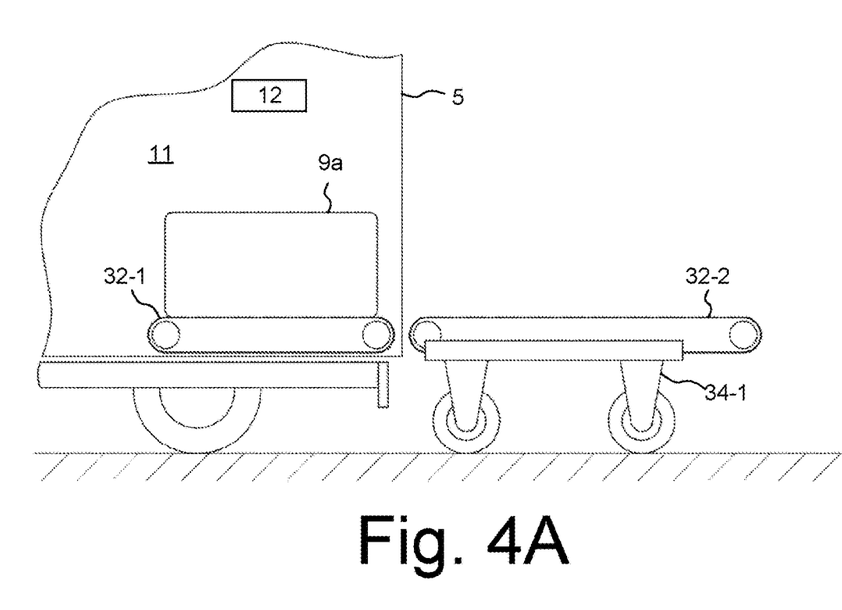
Figure 4B:
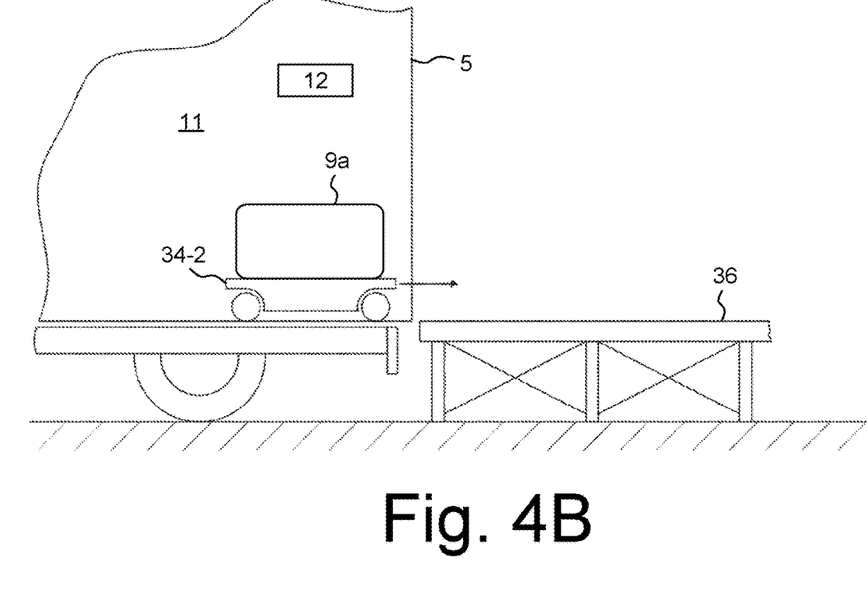

FIG. 4, which comprises a first example in FIG. 4A and a second example in FIG. 4B, schematically illustrates a side view of respective examples of a vehicle 5 adapted or retrofitted with components of an automated loading component 33, according to another embodiment. As described above, the automated loading component 33 is provided to transfer baggage items 9a from the sealed environment 11 of the vehicle 5 to a determined conveying destination. These exemplary embodiments illustrate the advantageous provision of a secured and trusted handover of a 'clean', i.e. security screened, baggage item 9a from one vehicle to another.

FIG. 4A illustrates an example of a vehicle 5 adapted with a first motorized conveyor segment 32-1 of the automated loading component 33, such as a roller, belt or band, on the base or floor of the sealed environment 11. The baggage item 9a rests on the conveyor segment 32-1 for screening by the primary screening unit 7 when the vehicle is in-transit to the departure terminal, using the one or more measuring devices 12 located in the sealed environment 11. In such an arrangement, access through an opening of the sealed environment 11 may be automatically controlled, for example by means of a motorised cover such as a door, lid, flap, gate, etc., when the on-board system 17 of the vehicle determines the vehicle is within a secure area of the departure terminal, and the baggage item 9a has passed the in-transit security screening checks. The cover may be further configured to seal and lock/unlock the opening based on a control device of the on-board system 17 that verifies the identity of a passenger associated with the baggage item. Additionally or alternatively, the system 17 may be configured to control access to the sealed environment 11 based on verification of identity data received via a data communication interface (not shown). For example, the identity data may identify a passenger associated with the baggage item 9a or a delegated authority.

A corresponding second motorized conveyor segment 32-2 of the automated loading component 33 may be provided at each of the secondary screening sub-system 43 and the cargo loading sub-system 45, to automatically receive the screened baggage item 9a transferred from the first conveyor segment 32-1, and to move the baggage item 9a towards the determined conveying destination. The second motorized conveyor segment 32-2 may be provided on an autonomous runner or trolley 34-1 as shown in FIG. 4A, to automatically move the received baggage item 9a resting thereon to the determined conveying destination. With such an arrangement, the on-board system 17 of the vehicle may include a control module for controlling the first conveyor segment 43-1 to allow the baggage item 9a to be displaced from the resting position within the sealed environment into a moving position in a fully automatic manner, after receiving confirmation that the measured screening parameters meet with the corresponding security parameters.

Alternatively, an autonomous runner or trolley 34-2 of the automated loading component 33 may form a part of the vehicle 5, provided within the sealed environment 11. The autonomous runner or trolley 34-2 may proceed to unload the baggage item 9a from the vehicle 5, for example by moving onto a loading platform 46 or other conveying component, as shown in FIG. 4B.

As yet a further alternative of an automated loading component 33, the aircraft hold may include one or more automated arms for handling the baggage items, the or each arm including a head for grasping an item of baggage from the trolley or platform, for loading the baggage item into the aircraft hold, for example onto a baggage conveyor on a floor of the aircraft hold. Alternatively, the vehicle 5 itself may include one or more automated arms for loading the baggage items into the aircraft hold or into a unit load device (ULD) destined for the aircraft hold.

Figure 3:
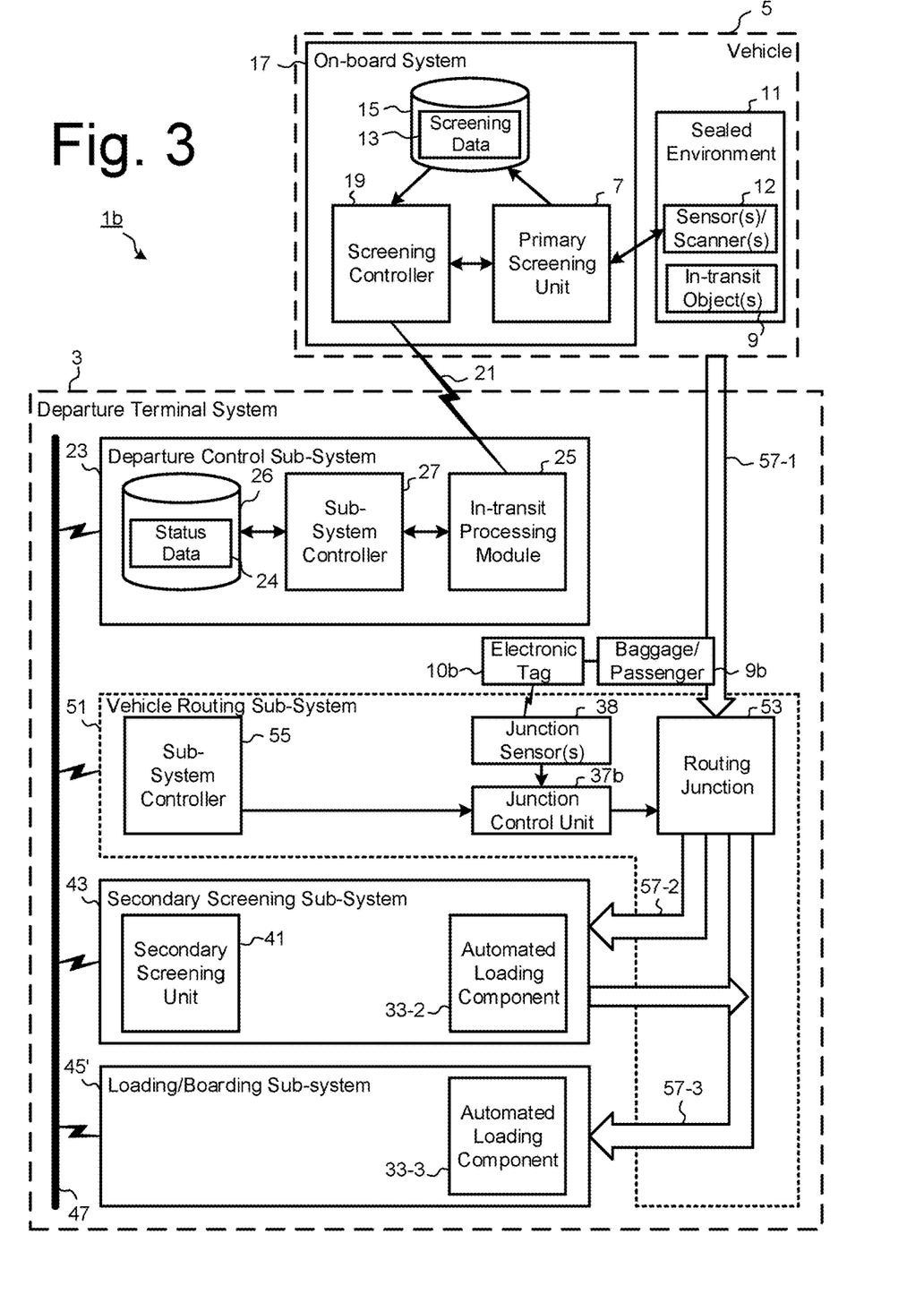
FIG. 3 is a schematic block diagram illustrating elements of an automated security inspection and routing system for in-transit objects according to other exemplary embodiments of the invention.

FIG. 3 is schematic block diagram illustrating elements of an object screening system 1b according to another exemplary embodiment, using corresponding reference numerals to those of FIG. 1 where appropriate for corresponding elements. In this embodiment, the in-transit object 9 is the passenger 9b seated within the hermetically sealed environment 11 of the vehicle cabin, and having an assigned travel ticket and itinerary associated with a respective commercial transportation craft. Each measuring device 12 may detect one or more measurable characteristics or attributes of the passenger 9b, such as size, weight, detected dangerous/illegal substances, temperature, moisture, biometric profile such as face, voice, finger print, etc. For example, the measuring device 12 may be one or more of: a pressure sensor, a camera, a microphone, a body scanner, CT scanner, EDS, ETD, X-ray system and/or metal detector, etc. The screening controller 19 may receive supplemental data from an RFID chip of a biometric passport via an RFID reader (not shown) to be correlated with data from the measuring device(s) 12. The screening data 13 is communicated by a screening controller 19 of the vehicle on-board system 17 to the departure terminal system 3, via a data communication path 21.

In this embodiment, the departure terminal system 3 processes the received in-transit screening data 13 to control a vehicle routing sub-system 51 that dynamically determines and sets a routing direction for a vehicle transporting the passenger 9b that is upstream and on an approach route 57-1 of a routing junction 53, on the basis of the associated in-transit screening data 13. The vehicle routing junction 53 may include, for example, a motorised gate, switch or platform, to move or guide a vehicle along a conveyor route or path. A junction control unit 37b is assigned to each routing junction 53, for example under super-control by a controller 55 of the vehicle routing sub-system 51. The junction control unit 37b processes security attribute data of the passenger 9b, received from the data processing module 27 of the departure control sub-system 23, and controls the associated routing junction 53 accordingly, for example to direct the vehicle downstream to a screening route 57-2 for further screening of the in-transit passenger 9b by at least one secondary screening unit 41 of a secondary security screening sub-system 43, or to different route that bypasses such further security screening, such as a boarding route 57-3 for passengers cleared for boarding onto the assigned aircraft, for example by an automated boarding sub-system 59.

It should be appreciated that the system 1 may include other components, sub-components, modules, and devices commonly found in a computing system/sub-system, such as a superordinate control system, which are not illustrated in FIGS. 1 and 2 for clarity of the description. It is also appreciated that an existing vehicle 5 may be modified on a retrofit basis to implement the in-transit screening arrangement within a sealed environment 11 and to integrate the on-board system 17 of the vehicle into the object screening system 1. The retrofitting kit may include sealing means to hermetically seal the cabin and/or hold environments of the vehicle. The vehicle 5 may instead or additionally be a self-driving, autonomous vehicle that is configured to determine driving or routing directions based at least upon data received from the departure terminal system 3. As yet another example, the vehicle 5 may be an autonomous flying drone or an autonomous trolley, platform, or capsule used for transporting people, baggage items, goods, an automobile, etc.

A description has been given above of the components forming part of an object screening system 1 of exemplary embodiments. The operation of these components will now be given with reference to the flow diagrams of FIG. 5, for an example computer-implemented security inspection, routing and handling process for in-transit objects according to another embodiment. As shown, the process may begin at step S5-1 where the screening controller 19 of the vehicle on-board system 17 detects the presence of one or more in-transit objects 9, such as baggage item(s) 9a and/or a passenger 9b. At step S5-3, the screening controller 19 generates and transmits a notification to the departure terminal system 3 associated with the travel ticket and itinerary assigned to the passenger and/or baggage item(s), identifying the in-transit object(s) 9 and requesting security parameters associated with the object(s) 9. The on-board system 17 may prompt and receive ticket and/or itinerary information from the passenger in order to determine the departure terminal system 3 to receive the notification. The screening controller 19 may be further configured to verify the identity of a passenger associated with a baggage item.

Figure 5A:
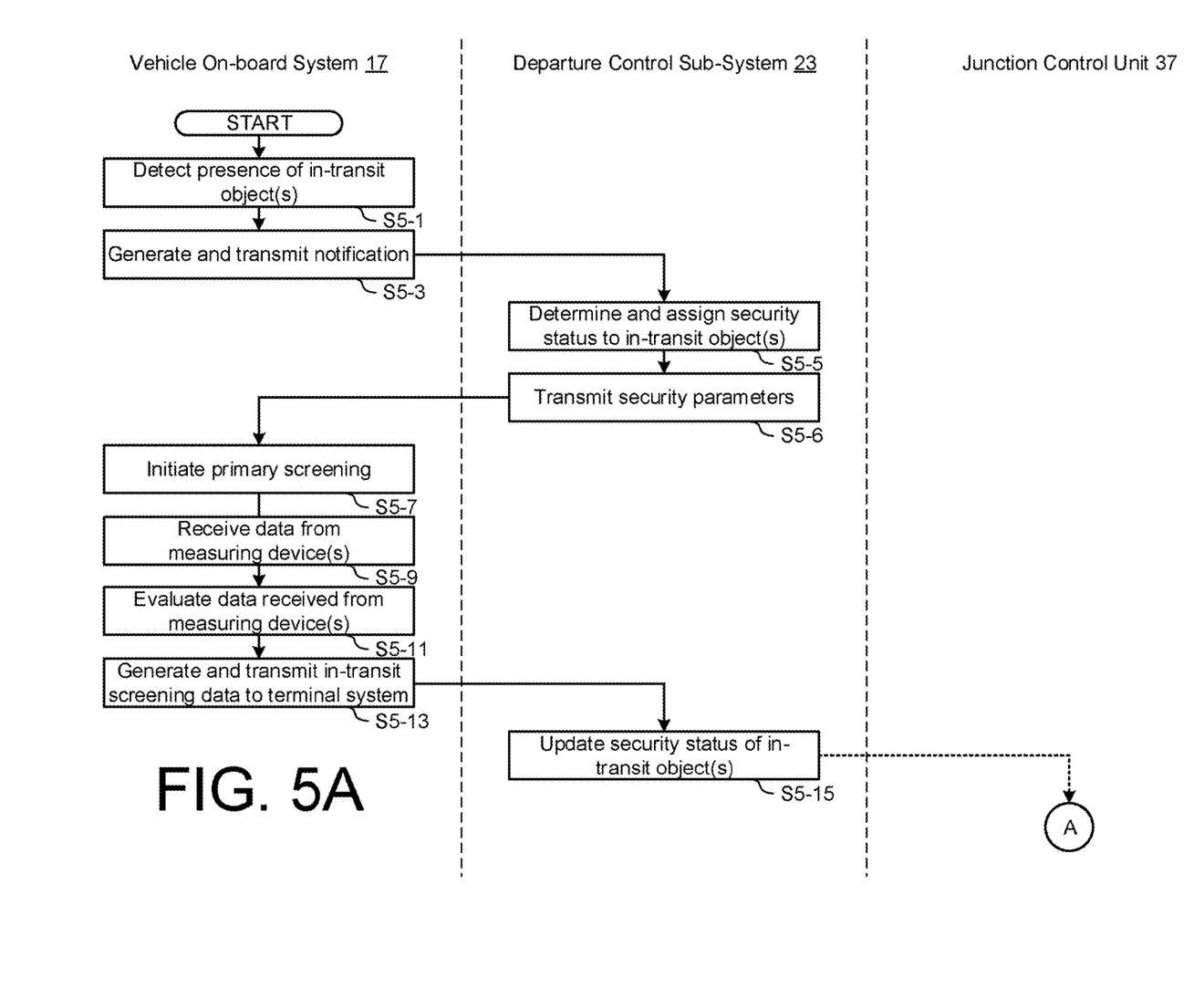
FIGS. 5A and 5B, is a flow diagram illustrating the main processing steps performed by the systems of FIGS. 1 and 3, according to another embodiment.
Figure 5B:
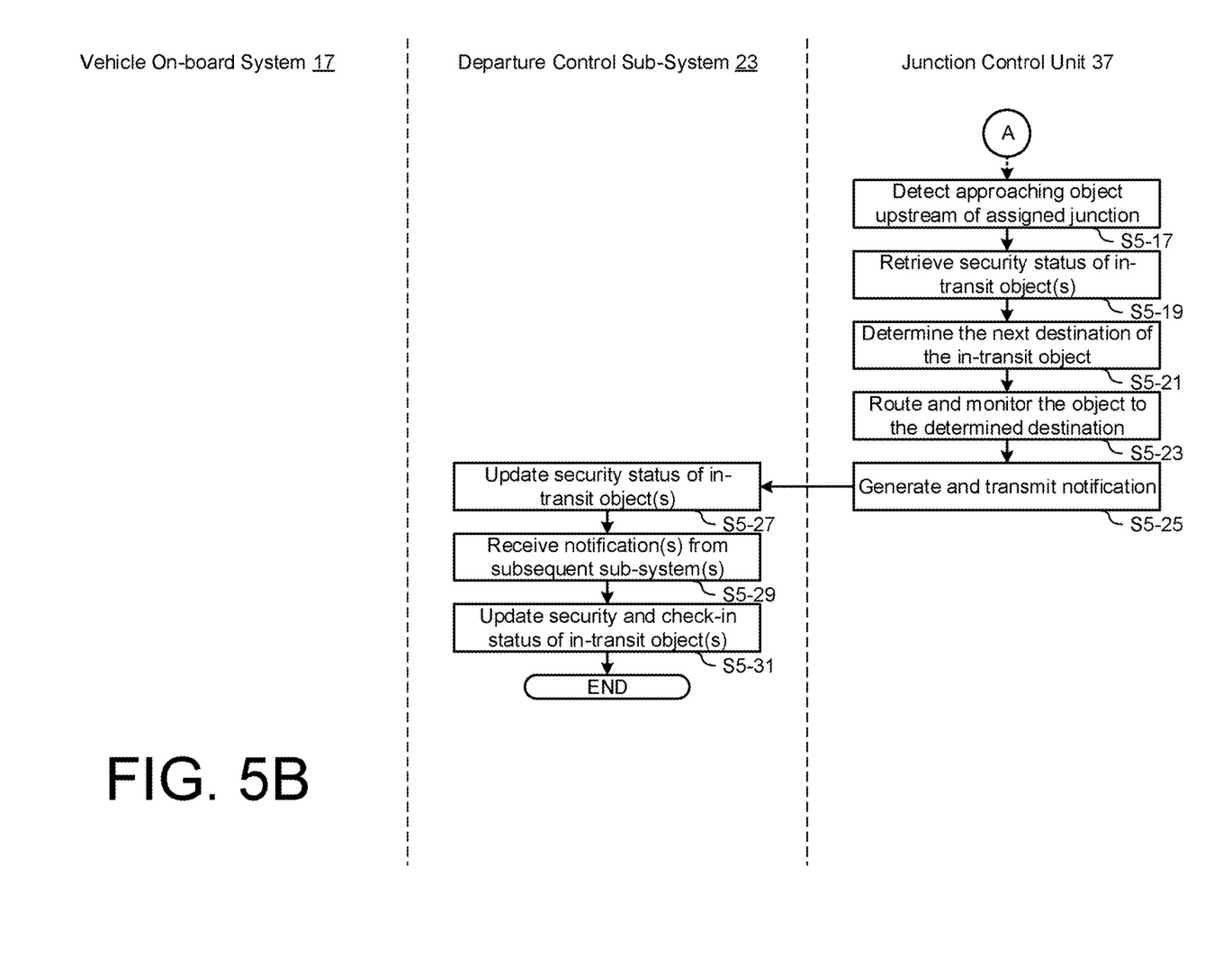

At step S5-5, the notification is received by the in-transit data processing module 25 of the departure control sub-system 23 and passed to the departure control sub-system controller 27. The departure control sub-system controller 27 retrieves stored departure status data 24 of the or each identified in-transit object 9 from the database 27, and assigns an initial security status to the or each identified in-transit object 9. At step S5-6, the departure control sub-system controller 27 identifies and transmits security parameters associated with the identified in-transit object(s) 9, as a response back to the screening controller 19 of the on-board system 17. In response, the screening controller 19 initiates primary screening of the identified in-transit object(s) 9 using the primary screening unit 7, at step S5-7. Alternatively, the passenger may interact with the on-board system 17 to initiate primary screening via a user interface of the screening controller 19.

At step S5-9, the screening controller 19 receives data from one or more measuring devices 12 provided in a hermetically sealed environment 11 of the vehicle 5, the data identifying one or more measurable characteristics or attributes of the or each in-transit object 9. At step S5-11, the screening controller 19 may evaluate the data received from the one or more measuring devices 12, for example to compare the data against the corresponding security parameters received from the departure control sub-system 23. At step S5-13, the screening controller 19 generates and transmits in-transmit screening data 13 to the departure terminal system 3, the screening data 13 including the data from one or more measuring devices 12 and/or the output of the evaluation. At step S5-15, the departure control sub-system 27 receives the in-transmit screening data 13 via the in-transit processing module 25, and updates the security status of the or each in-transit object 9 in the associated departure status data 24 stored in the database 26, to conclude the in-transit primary screening process.

The vehicle 5 will subsequently approach the departure terminal, typically following completion of the in-transit primary screen process as described above. Accordingly, at step S5-17, the junction control unit 37b of the vehicle routing sub-system 51 may detect that the upstream passenger 9b and/or vehicle 5 is approaching the associated routing junction 53, for example by means of the associated junction sensor(s) 39. In response, the junction control unit 37b may retrieve the security status data of the identified passenger 9b at step S5-19 from the associated stored departure status data 24, for example via the departure control sub-system controller 27 and the data network 47. At step S5-21, the junction control unit 37b determines the next destination of the vehicle 5 transporting the in-transit passenger 9b.

At step S5-23, the junction control unit 37b controls the routing junction 53 to route the vehicle 5, and the passenger 9b, to the determined destination. The vehicle routing sub-system controller 55 may be configured to monitor the vehicle 5 and/or passenger 9b travelling along the determined route 57-2,57-3. At step S5-25, the junction control unit 37b may generate and transmit a routing update notification for the in-transit passenger 9b, to the departure control sub-system 23. In response, the departure control sub-system controller 27 may process the received notification identifying the in-transit passenger 9b, and update the security status data of the identified passenger 9b, at step S5-27. At step 3-29, the departure control sub-system controller 27 may subsequently receive further update notifications from the sub-systems associated with the determined destination, such as the secondary screening sub-system 43 and boarding sub-system 57 following subsequent processing and/or handling of the identified passenger 9b. At step S5-31, the departure control sub-system controller 55 may update the security and departure status of the associated passenger 9b based on the received further update notifications.

It is appreciated that steps S5-17 to S5-31 may be carried out instead or additionally in relation to an in-transit baggage item 9a approaching a conveyor junction 35 of the baggage conveyor sub-system 29, whereby a routing determination is made by the associated junction control unit 37a based on the received in-transit screening data 13 associated with the baggage item 9a, for example to route the baggage item 9a toward either the secondary screening sub-system 43 or the cargo loading sub-system 45.

Example Computer System Implementation

Figure 6:
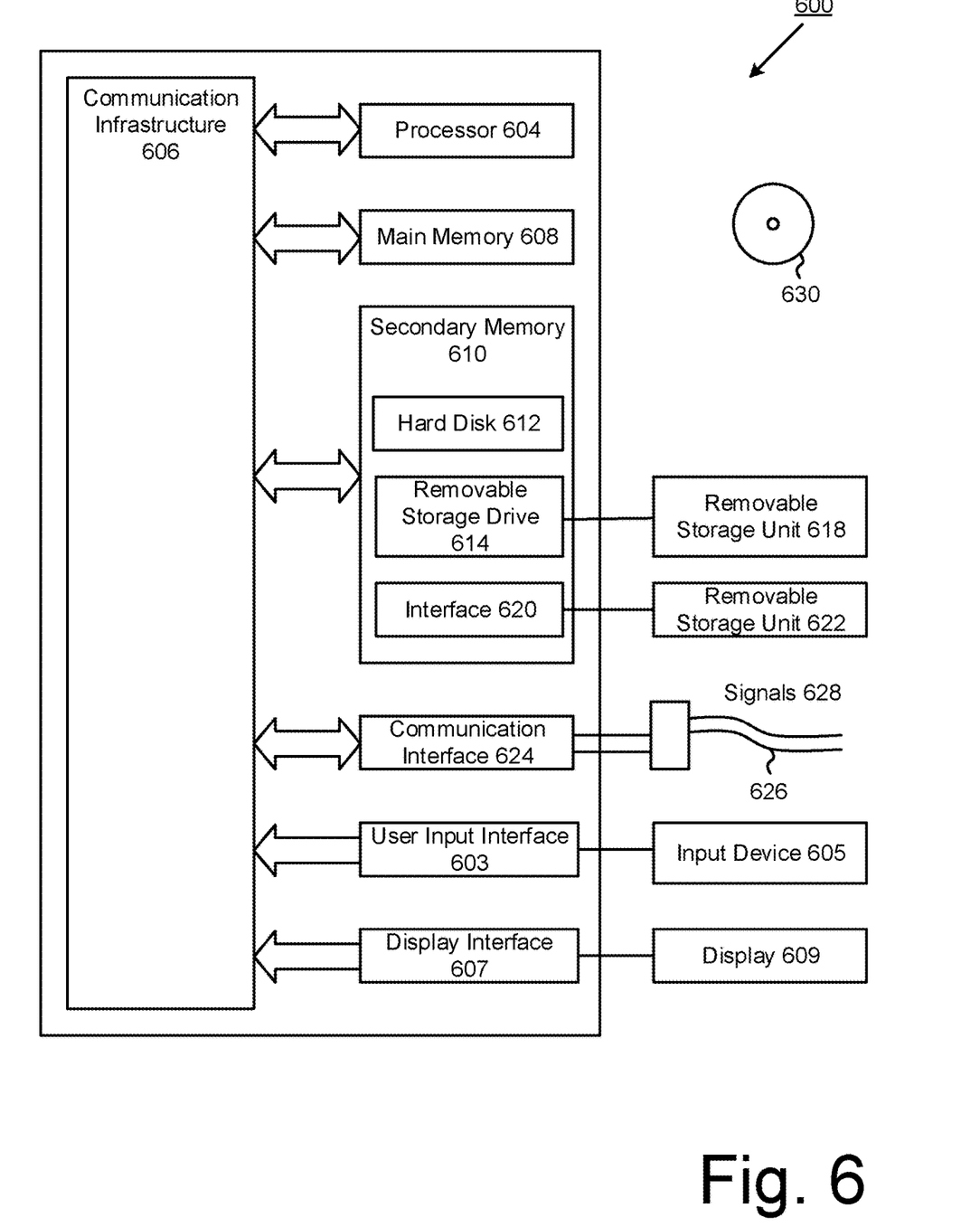
FIG. 6 is a diagram of an example of a computer system on which one or more of the functions of the embodiments may be implemented.

Various aspects of the present invention can be implemented by software, firmware, hardware, or a combination thereof. FIG. 6 illustrates an example computer system 600 in which the present invention, or portions thereof, can be implemented as computer-readable code. For example, the method illustrated by the flowchart of FIG. 5 can be implemented in one or more such systems 600. The on-board system, the departure terminal system architecture and/or the respective sub-systems of FIGS. 1 and 2 can also each be implemented in one or more such systems 600. After reading this description, it will become apparent to a person skilled in the relevant art how to implement the invention using other computer systems and/or computer architectures.

Computer system 600 includes one or more processors, such as processor 604. Processor 604 can be a special purpose or a general-purpose processor. Processor 604 is connected to a communication infrastructure 606 (for example, a bus, or network). It will be appreciated that use of the terms "unit", "module" and data processing "means" throughout the embodiments may form part of such a processor and implemented in software.

Computer system 600 also includes a main memory 608, preferably random access memory (RAM), and may also include a secondary memory 610. Secondary memory 610 may include, for example, a hard disk drive 612, a removable storage drive 614, flash memory, a memory stick, and/or any similar non-volatile storage mechanism. Removable storage drive 614 may comprise a floppy disk drive, a magnetic tape drive, an optical disk drive, a flash memory, or the like. The removable storage drive 614 reads from and/or writes to a removable storage unit 618 in a well-known manner. Removable storage unit 618 may comprise a floppy disk, magnetic tape, optical disk, etc. which is read by and written to by removable storage drive 614. As will be appreciated by persons skilled in the relevant art(s), removable storage unit 618 includes a non-transitory computer usable storage medium having stored therein computer software and/or data.

In alternative implementations, secondary memory 610 may include other similar means for allowing computer programs or other instructions to be loaded into computer system 600. Such means may include, for example, a removable storage unit 622 and an interface 620. Examples of such means may include a program cartridge and cartridge interface (such as that found in video game devices), a removable memory chip (such as an EPROM, or PROM) and associated socket, and other removable storage units 622 and interfaces 620 which allow software and data to be transferred from the removable storage unit 622 to computer system 600.

Computer system 600 may also include a communications interface 624. Communications interface 624 allows software and data to be transferred between computer system 600 and external devices. Communications interface 624 may include a modem, a network interface (such as an Ethernet card), a communications port, a PCMCIA slot and card, or the like.

Computer system 600 may additionally include computer display 630. According to an embodiment, computer display 630, in conjunction with display interface 602, can be used to display UI 115 on operator console 110.

In this document, the terms "computer program medium," "non-transitory computer readable medium," and "computer usable medium" are used to generally refer to media such as removable storage unit 618, removable storage unit 622, and a hard disk installed in hard disk drive 612. Computer program medium, computer readable storage medium, and computer usable medium can also refer to memories, such as main memory 608 and secondary memory 610, which can be memory semiconductors (e.g. DRAMs, etc.). These computer program products are means for providing software to computer system 600.

Computer programs (also called computer control logic) are stored in main memory 608 and/or secondary memory 610. Computer programs may also be received via communications interface 624. Such computer programs, when executed, enable computer system 600 to implement the present invention as discussed herein. In particular, the computer programs, when executed, enable processor 604 to implement the processes of the present invention, such as the steps in the methods illustrated by flowchart 200 of FIG. 2 and system architecture 100 of FIG. 1 discussed above. Accordingly, such computer programs represent controllers of the computer system 600. Where the invention is implemented using software, the software may be stored in a computer program product and loaded into computer system 600 using removable storage drive 614, interface 620, hard drive 612, or communications interface 624.

The invention is also directed to computer program products comprising software stored on any computer useable medium. Such software, when executed in one or more data processing device, causes a data processing device(s) to operate as described herein. Embodiments of the invention employ any computer useable or readable medium, known now or in the future. Examples of computer useable mediums include, but are not limited to, primary storage devices (e.g., any type of random access memory), secondary storage devices (e.g., hard drives, floppy disks, CD ROMS, ZIP disks, tapes, magnetic storage devices, optical storage devices, MEMS, nano-technological storage device, etc.), and communication mediums (e.g., wired and wireless communications networks, local area networks, wide area networks, intranets, etc.).

Modifications and Alternative Embodiments

It will be understood that embodiments of the present invention are described herein by way of example only, and that various changes and modifications may be made without departing from the scope of the invention.

For example, in the embodiments described above, the junction control units are configured to determine a next destination for an approaching object, based on the associated in-transit screening data received from the primary screening unit. As an alternative, a routing controller may instead be provided, for example as a processing module of the conveyor/routing sub-system(s) or of the departure terminal system itself, to carry out the data processing as described above to determine a next destination for an object approaching a conveyor/routing junction. In such an embodiment, the routing controller may be configured to identify attributes assigned to the object, such as the associated transportation craft identifier, itinerary data and security status. The routing controller may then process the output of the primary security screening device and update the assigned security status data of the object accordingly, before generating routing data for the object in dependence upon the updated security status data of the object. The junction control unit assigned to the or each conveyor switch point may then be configured to receive the generated routing data from the routing controller for the object upstream of the conveyor switch point, and in response, to set a routing direction on the basis of the routing data, whereby the object is directed to a screening route for further screening by at least one secondary security screening device, or to a loading route for objects cleared for loading onto the assigned transportation craft.

Reference in this specification to "one embodiment" are not necessarily all referring to the same embodiment, nor are separate or alternative embodiments mutually exclusive of other embodiments. In particular, it will be appreciated that aspects of the above discussed embodiments can be combined to form further embodiments. For example, alternative embodiments may both the baggage conveyor sub-system and the vehicle routing sub-system described in the above embodiments. Similarly, various features are described which may be exhibited by some embodiments and not by others. Yet further alternative embodiments may be envisaged, which nevertheless fall within the scope of the following claims.

The invention claimed is:

1. A system comprising:
   a vehicle comprising a sealed environment, the sealed environment comprising a conveyor device and a plurality of measuring devices positioned at respective locations within the sealed environment to provide substantially full coverage of the internal area of the sealed environment, wherein the sealed environment is sealed when the vehicle is in use;
   the conveyor device operable to displace a baggage item from a resting position into a moving position in a fully automatic manner by means of a motor; and
   a control module configured to control the conveyor device by:
     receiving, from the plurality of measuring devices in the sealed environment of the vehicle, screening parameters of the baggage item;
     verifying the measured screening parameters against corresponding security parameters; and
     responsive to verification that the security parameters are observed, outputting a control signal to cause a displacing movement of the baggage item by the conveyor device.

2. The system of claim 1, wherein the control module is further configured to determine that the vehicle is adjacent a loading platform or a second conveyor device before controlling the displacing movement of the conveyor device.

3. The system of claim 2, wherein the control module is further configured to transmit said measured screen parameters to a baggage conveying system of the loading platform or another conveyor device.

4. The system of claim 1, further comprising a data token generator configured to generate, responsive to checking by the checking device that the security parameters are observed, a security data token to be verified by a remote system.

5. The system of claim 1, wherein the sealed environment is a hold, boot or trunk of a motor vehicle, which is sealed when a lid is closed.

6. The system of claim 1, wherein the environment is hermetically sealed to prevent introduction of particles to the environment when the vehicle is in use.

7. The system of claim 1, wherein at least one measuring device is located centrally on a ceiling surface of the sealed environment.

8. The system of claim 1, wherein each measuring device has a respective effective scanning direction and range.

9. The system of claim 1, wherein at least one measuring device comprises a suction device configured to measure for the presence of particulates in the sealed environment.

10. The system of claim 1, wherein at least one measuring device comprises a sensor configured to measure one or more of visible or invisible characteristics, temperature, light, sound, pressure, and presence of dangerous and/or illegal substances.

11. The system of claim 1, further comprising a controller configured to control access to the sealed environment based on verification of identity data.

12. The system of claim 11, wherein the identity data identifies a delegated authority.

13. The system of claim 1, wherein the sealed environment comprises an opening to receive a baggage item, and a cover to seal and lock said opening, which cover being configured to lock and unlock based on a control device that verifies the identity of a passenger associated with the baggage item.

14. The system of claim 1, wherein the vehicle is an autonomous trolley or drone.

* * * * *